June 6, 1950 — E. A. JUZWIAK — 2,510,231
FERTILIZER DISTRIBUTOR
Filed April 28, 1949 — 6 Sheets-Sheet 1
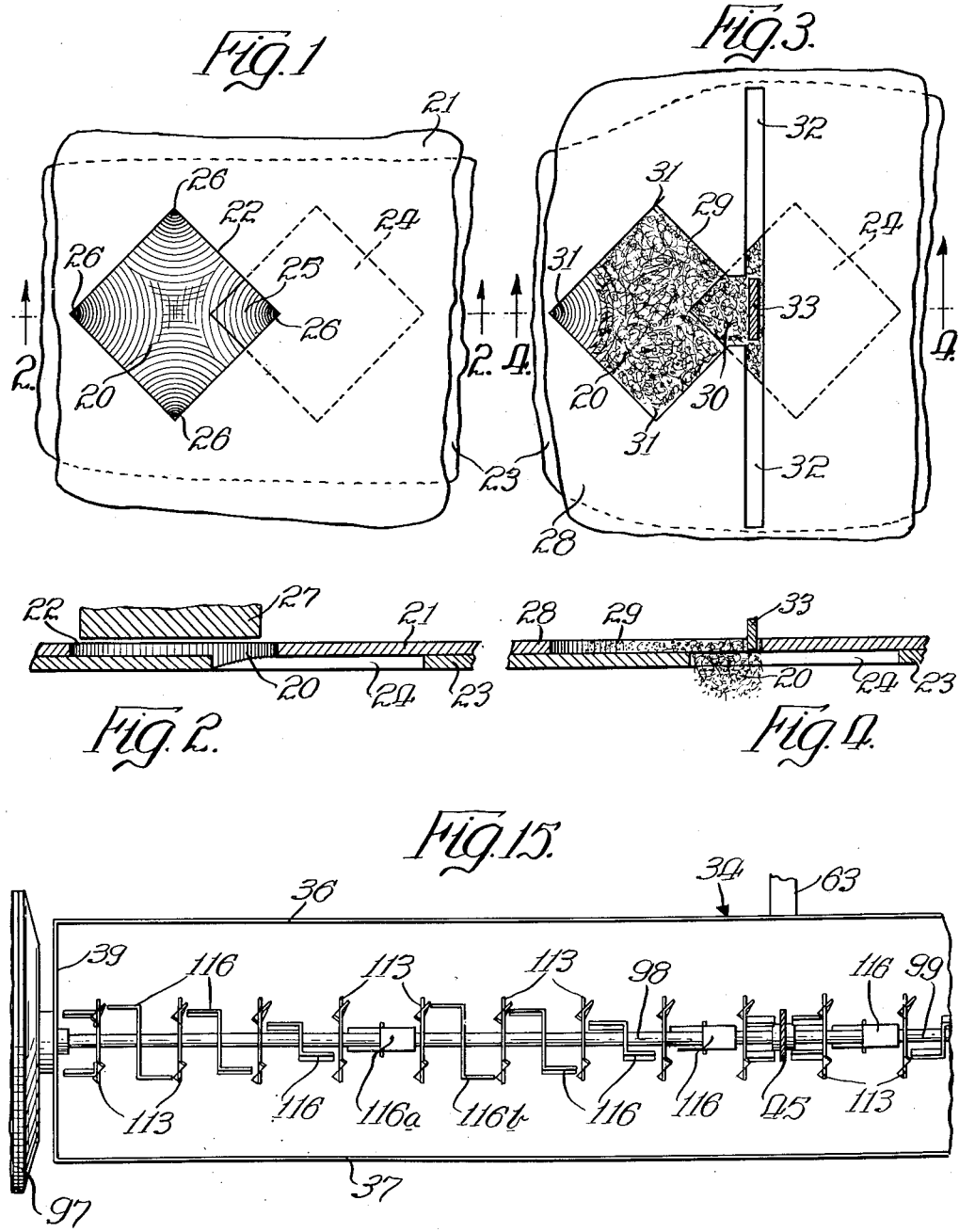
INVENTOR.
Edmond A. Juzwiak
BY Kegan and Kegan
Attys.

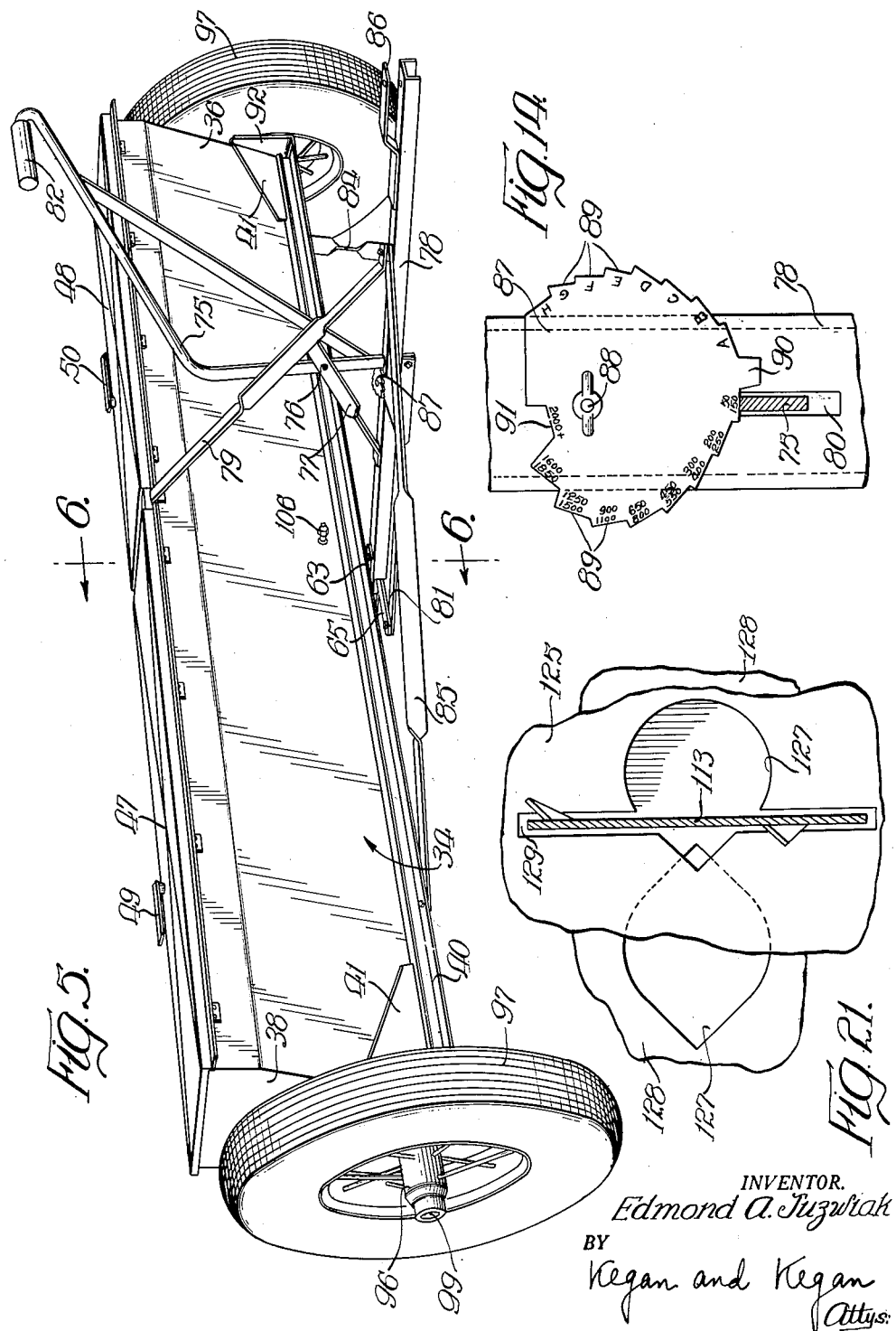

June 6, 1950 E. A. JUZWIAK 2,510,231
FERTILIZER DISTRIBUTOR
Filed April 28, 1949 6 Sheets-Sheet 3
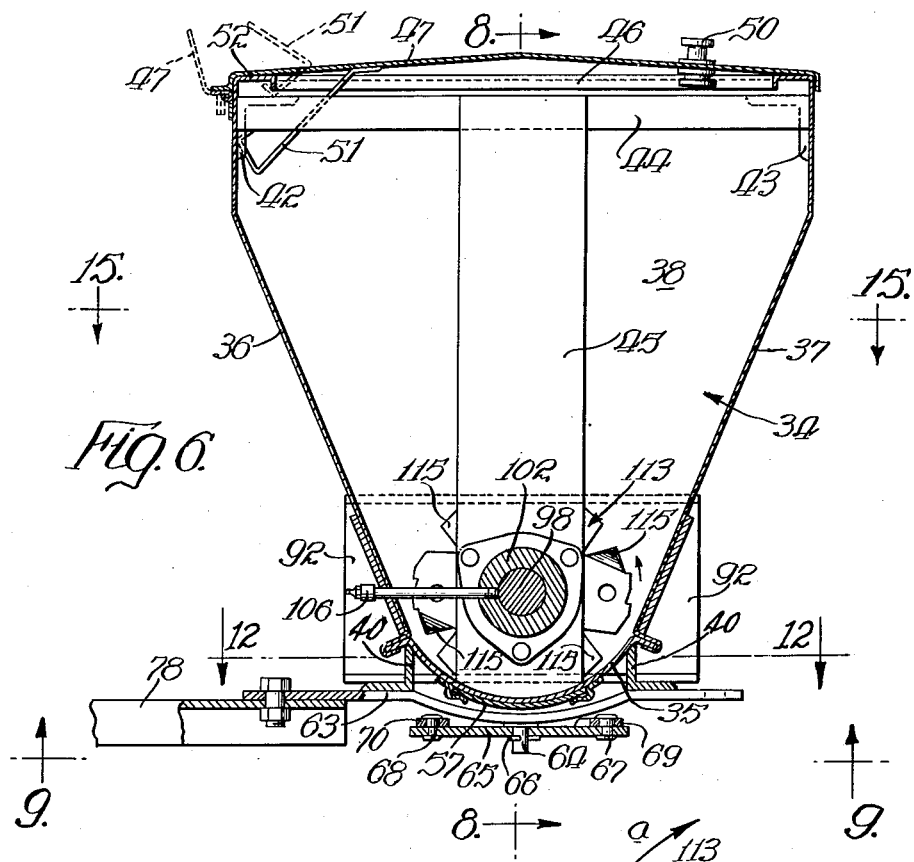
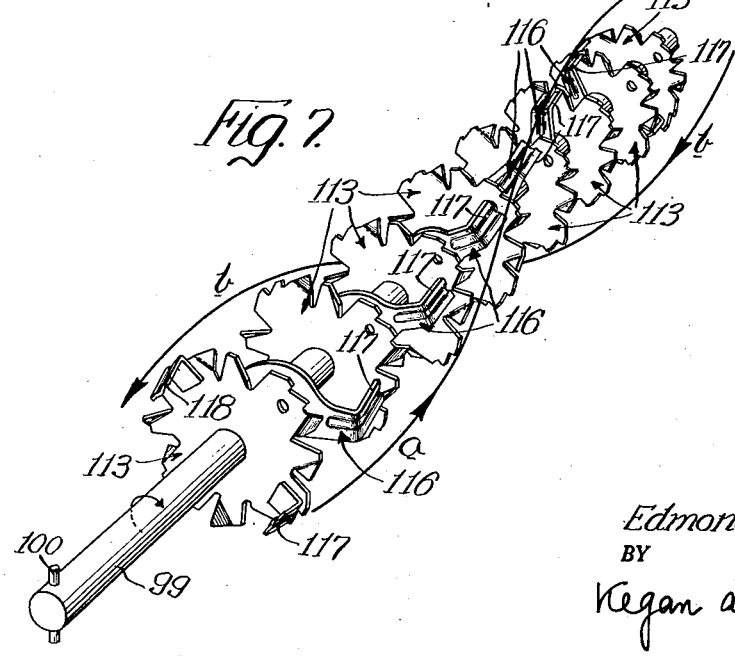
INVENTOR.
Edmond A. Juzwiak
BY
Kegan and Kegan
Attys.

June 6, 1950 E. A. JUZWIAK 2,510,231
FERTILIZER DISTRIBUTOR
Filed April 28, 1949 6 Sheets-Sheet 4
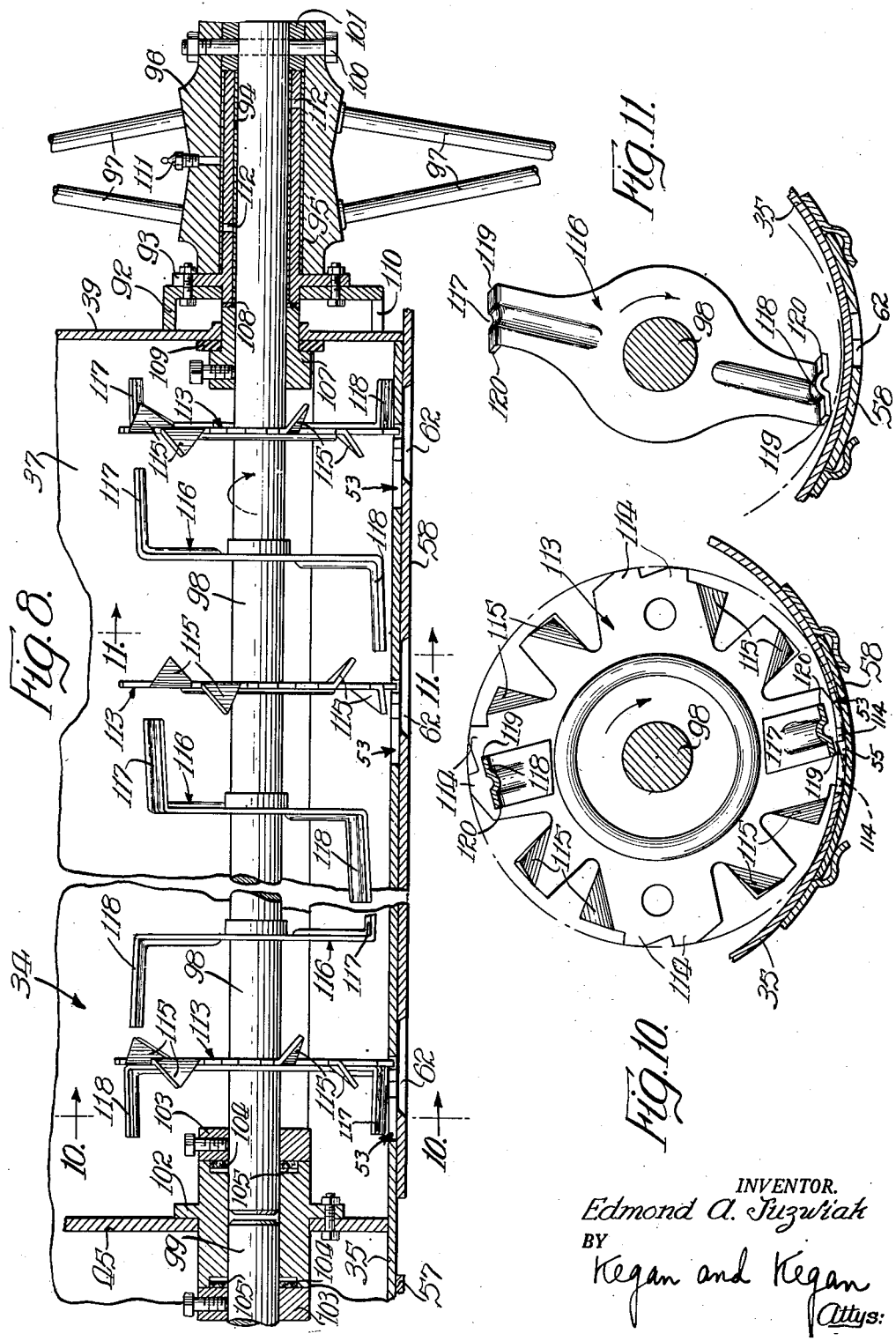
INVENTOR.
Edmond A. Juzwiak
BY
Kegan and Kegan
Attys.

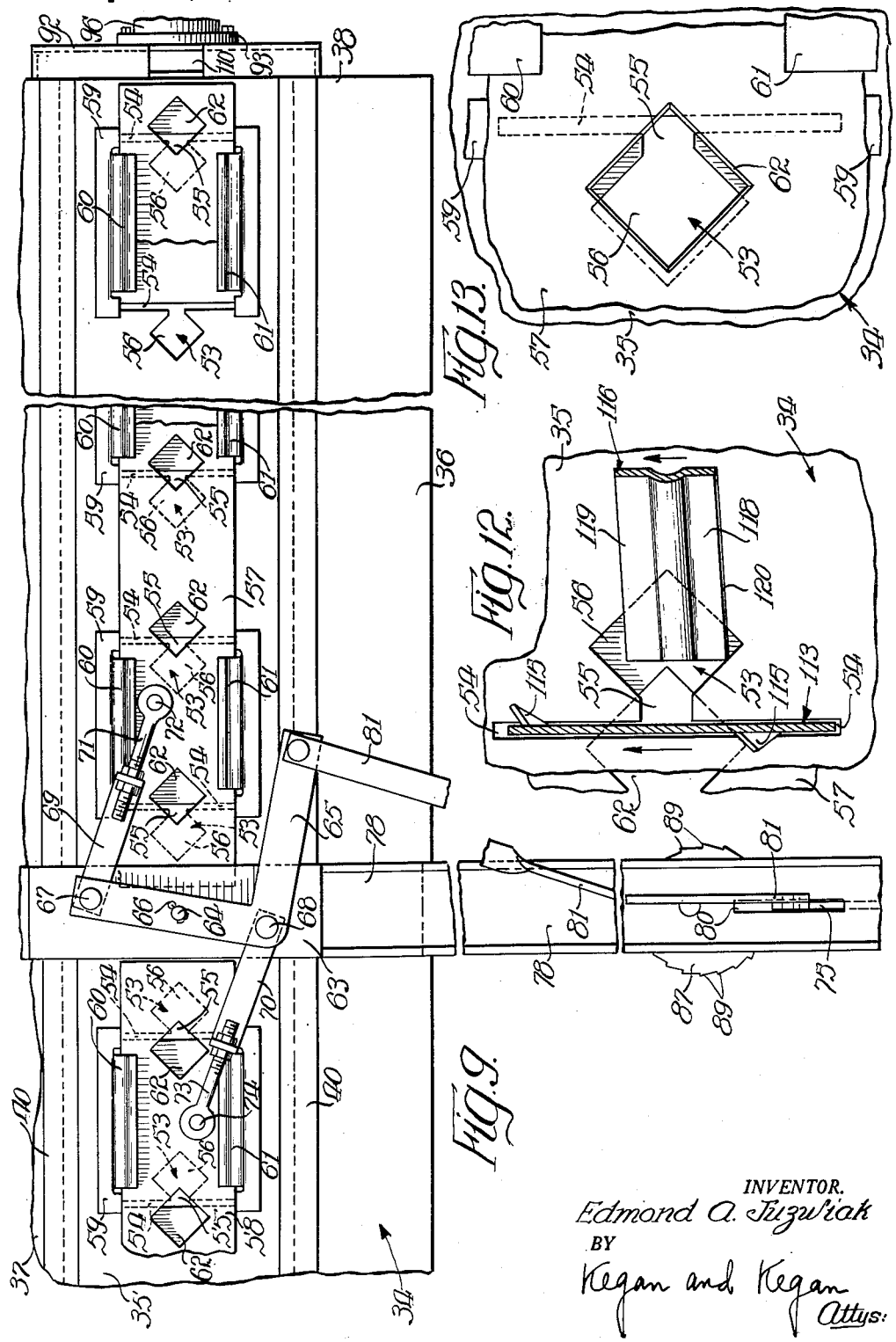

June 6, 1950 — E. A. JUZWIAK — 2,510,231
FERTILIZER DISTRIBUTOR
Filed April 28, 1949 — 6 Sheets-Sheet 6
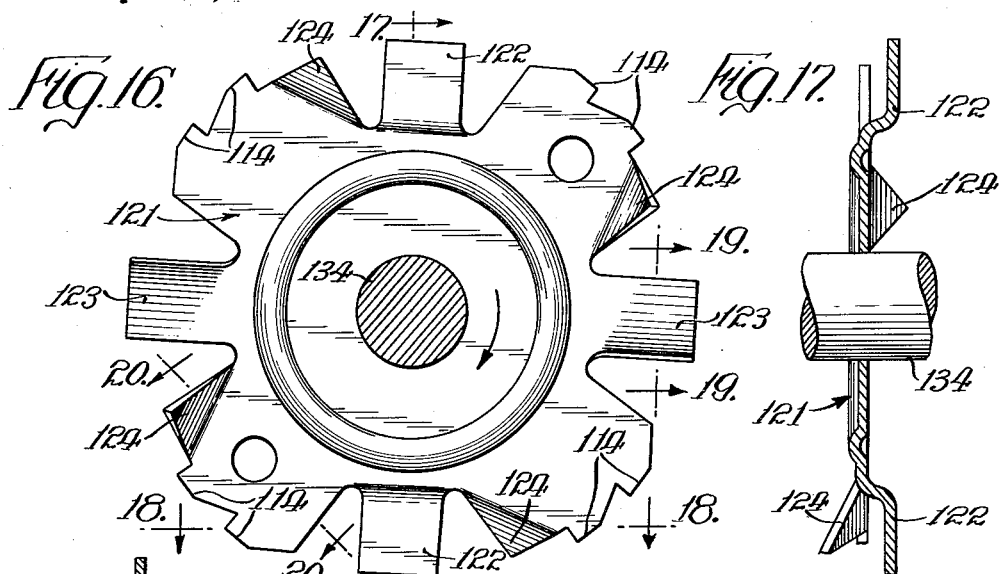
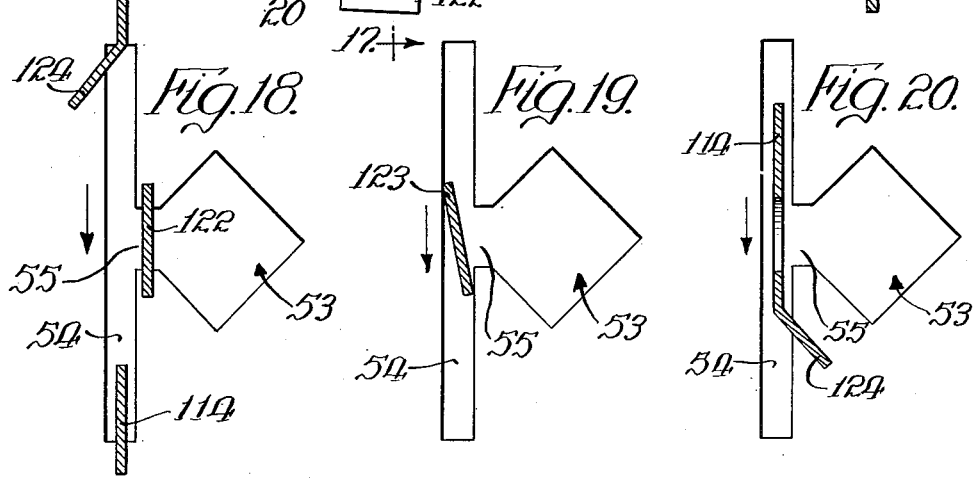
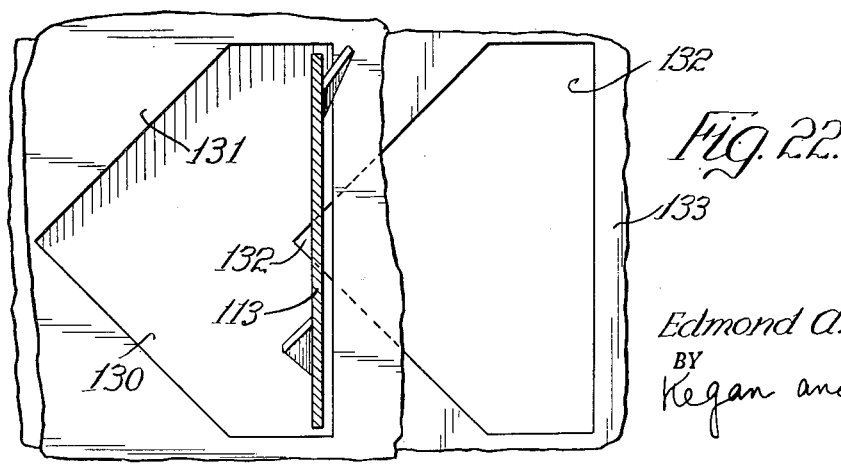
INVENTOR.
Edmond A. Juzwiak
BY Kegan and Kegan
Attys.

Patented June 6, 1950

2,510,231

UNITED STATES PATENT OFFICE 2,510,231

FERTILIZER DISTRIBUTOR

Edmond A. Juzwiak, Chicago, Ill., assignor to Power Production Company, Chicago, Ill., a corporation of Illinois Application April 28, 1949, Serial No. 90,086

22 Claims. (Cl. 222—177)

My invention relates generally to material spreading apparatus and more particularly to improvements in the feed mechanism of spreaders of the type used to spread or sow lime, fertilizers and other fluent solid chemicals; grains, grasses, legumes and like materials. While my invention is applicable to material dispensing in general, it has special application to and utility in agricultural spreader and seeder apparatus.

This application is a continuation-in-part of my prior application filed June 6, 1947, Serial No. 752,935, now abandoned and entitled Spreader.

The principal problem in dispensing materials of the type specified above, is to maintain a steady, even flow of the fluent solid material throughout the length of the spreader, even though the material which is being handled is highly cohesive (such as for example super phosphate fertilizer); wet, green or improperly cured fertilizer; damp and/or densely packed seeds or grains; or old fertilizer which has set up and become lumpy and hard. Another and related problem is that of dispensing such material even at such small rates of discharge as 50 pounds per acre, so that highly concentrated fertilizers may be efficiently used.

Before my invention, however, no satisfactory equipment had been developed or constructed which met these problems. The reasons for the inherent deficiencies of the prior art spreaders and seeders is evident upon consideration of Figures 1 and 2 of the accompanying drawings, the apparatus schematically shown in these figures fairly representing the prior art constructions. More particularly, the element 21 may be taken as representing the bottom of a bin or hopper in which the material 20 to be dispensed is stored or placed. A diamond-shaped, square or circular opening typically is placed in the element 21 and serves as the discharge port 22. Placed beneath the element 1, and adjustable therealong is an element 23, containing an aperture 24, which generally is so configured as to be registrable in part or in whole with the discharge port 22. By adjusting the degree of registration between the discharge port 22 and the aperture 24, the effective discharge area 25 is determined. It is at once apparent that if the discharge area 25 is to be small, yet not impede the flow of granular material, or small lumps of material, that the discharge port 22 and the aperture 24 must assume a shape or configuration similar to that shown in Figure 1. For this reason, a diamond-shaped or square-shaped opening is preferred and generally used.

When the effective area 25 is relatively small, as shown, and especially when damp or highly cohesive materials are being dispensed, the material tends to become clogged within the opening, and to stop the free flow of material from the hopper. This undesirable result is due in large measure to the tendency of the material to stratify in the static corners 26 and experience has shown that this stratification spreads rapidly throughout the entire discharge port 22, including the discharge area 25 thereof.

Moreover, this tendency for material to become stratified within the discharge port 22 is promoted by the type of agitator and feed members placed within the prior art devices. In general, these members comprise a bar or spoke 27 which sweeps across the element 21 above the discharge port 24. This sweeping action packs and compresses the material tightly within the discharge port 24 and thereby intensifies stratification of the material. Since nothing is provided capable of effectively breaking up the compressed, stratified material, the usual result is that the flow of material is at best only spasmodic. Usually the operator has to stop the spreader every two or three hundred feet and clear each discharge port, using a pick, screwdriver or other sharp instrument for this purpose.

While this difficulty is especially noticeable when the effective area 25 is small, and/or the material which is being discharged is wet, lumpy or highly cohesive, stratification and clogging may be pronounced when materials such as super phosphate are dispensed under the most ideal conditions, namely the discharge area 25 is large, and the material is dry and finely divided.

The principal object of my invention is to provide spreader means which are capable of distributing fertilizer, lime, grains, grasses, legumes and other similar materials in an even, steady stream, regardless whether the material is dry, moist, granular, lumpy, cohesive, or is in the form of large, rock-hard blocks; whether the discharge opening is so set as to discharge as little as 50 pounds of material per acre; or whether the discharge area is increased so as to permit as much as 2,000 or more pounds to be spread over each acre.

The broad, underlying concept of my invention will be readily perceived upon consideration of the apparatus schematically shown in Figures 3 and 4 of the drawings. So that my invention may be readily compared with the prior art constructions, the construction shown in Figures 3 and 4 includes the same lower element 23 having an aperture 24 therein, and an upper element 28 having a discharge port 29 which includes a substantially diamond-shaped portion similar to the discharge port 22 of Figures 1 and 2. Again, it will be apparent that by shifting the lower element 23 relative to the upper element 28, that the effective discharge area 30 may be varied. To avoid stratification and clogging of the material within the discharge port 29, however, I provide means whereby one corner of the discharge port 29, and preferably that corner which is in register with the smaller discharge areas, is made "dynamic" rather than static. By "dynamic" is meant that the material at this portion of the discharge port 29 is agitated and vibrated sufficiently so as to emanate vibratory impulses toward the corners 31. In this manner, stratification cannot engulf the discharge port 29 and at most is isolated to the very corners 31 of the port 29. As will be shown as this exposition proceeds, my invention includes further novel features which eliminate even this small amount of stratification.

In the example shown in Figures 3 and 4, the means for breaking the "dynamic" corner comprises extending a channel or slot 32 across one end of the diamond-shaped portion of the discharge port 29. It will be noted that the slot 32 extends through only the upper element 28, the lower element 23 containing only the diamond-shaped aperture 24. Further, and as best shown in Figure 4, I provide a member 33 adapted to extend within the slot 32 and further adapted to break up any material which tends to cake or to stratify within the effective discharge area 30. For example, the member 33 might be rotated so as to intermittently sweep through the slot 32, or alternately, could be reciprocated to and fro along the slot 32. In either case, it is important that the member 33 actually penetrate within the slot 32, rather than being merely swept across the element 28 as in the manner of Figures 1 and 2. In the examples shown, the member 33 does not penetrate beyond slot 32, and hence the element 23 can be shifted at will to completely cover the discharge port 29. In the event that there is clearance between the lower element 23 and the upper element 28 then the member 33 may penetrate beyond the slot 32 to the extent that said member 33 does not appreciably interfere with movement of the lower element 23. In either case the flow of material can be completely shut off at any time by the operator.

In order that my invention may be more fully disclosed, reference is had to the accompanying drawings which illustrate apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the sepcification or shown in the drawings.

In the drawings:

Figures 1 and 2, as noted previously, are illustrative of the prior art, Figure 1 being a fragmentary plan elevational view, and Figure 2 being a front elevational view taken in section on the line 2—2 of Figure 1;

Figures 3 and 4, as noted above, illustrate diagrammatically the principal concept of my invention, Figure 3 being a fragmentary plan elevational view and Figure 4 being a side elevational view taken in section on the line 4—4 of Figure 3;

Figure 5 is a perspective view of a wheel supported material spreader incorporating my invention;

Figure 6 is a side elevational view taken in central section substantially on the line 6—6 of Figure 5;

Figure 7 is a perspective view of a portion of an armature forming a part of the embodiment of Figure 5;

Figure 8 is a fragmentary front elevational view taken substantially in section on the line 8—8 of Figure 6;

Figure 9 is a fragmentary bottom view taken on the line 9—9 of Figure 6;

Figure 10 is a side elevational view taken in section on the line 10—10 of Figure 8, and shows one embodiment of the member 33 shown schematically in Figures 3 and 4;

Figure 11 is a side elevational view, taken in section on the line 11—11 of Figure 8, showing in detail one of the feeding and agitating members forming a part of the armature of Figure 7;

Figure 12 is a plan view, taken substantially in section on the line 12—12 of Figure 6;

Figure 13 is a fragmentary bottom view illustrating the manner in which the effective discharge area through which material is discharged may be adjusted;

Figure 14 is a fragmentary plan elevational view, showing the flow regulator plate whereby the size of the effective discharge area (Figure 13) may be regulated;

Figure 15 is a plan view, taken in section on the line 15—15 of Figure 6, and shows a modified form of the armature of Figure 7;

Figure 16 is a side elevational view, showing a second embodiment of the member 33 of Figures 3 and 4;

Figure 17 is a front elevational view taken in section on the line 17—17 of Figure 16;

Figures 18, 19 and 20 illustrate somewhat diagrammatically the manner in which the portions taken on the corresponding section lines of Figure 16 each contributes to the efficient discharge of material from the spreader;

Figure 21 illustrates an alternate design for the discharge port of my invention; and Figure 22 illustrates a second alternate design of the discharge port.

Like reference characters designate like parts in the drawings and in the description thereof following hereafter.

Before proceeding with a detailed description of the construction and operation of the several parts comprising the embodiment shown in the drawings, and to better indicate the broad concepts of my invention, I describe, in brief outline below, the organization and co-action of the principal sub-combinations and parts comprising said embodiment. More particularly, this spreader and seeder apparatus includes (1) a hopper in which material is placed, said hopper having one or more openings therein of the character illustrated in Figures 3 and 4, supra, (2) shutter means for regulating the discharge area of these openings, (3) an armature rotatable within the hopper and including (4) means adapted to break and make dynamic one corner of each of the discharge ports, (5) means for charging the discharge ports from the material immediately adjacent the ports, and (6) means for agitating and distributing the material lengthwise of the armature, so that the flow of material is uniform from each port, whether there be one or twenty such discharge ports.

Referring now to Figures 5 and 6, the hopper, designated generally by the numeral 34, is shown as including a bottom plate 35, a front wall 36 and a rear wall 37 secured thereto, and end walls 38 and 39. Two angle irons 40, 40 extend lengthwise of the bottom plate 35 and on each side thereof, respectively, to provide transverse stiffening of the hopper 34. Additional stiffening is provided by the gussets 41 at each corner of the hopper 34. Internally, the hopper 34 is reinforced by the transverse angle irons 42 and 43 in the upper portion thereof, the center cross brace 44, the vertical center post 45, and intermediate cross supports 46. A pair of cover lids 47 and 48 (Figure 5) is hinged to the front wall 36, said lids 47 and 48 being secured in place by means of the handles 49 and 50. The lids 47 and 48 are held in the open position (shown in dotted lines in Figure 6) by brackets 51 which engage the top, flanged edge 52 of the front wall 36.

As is best shown in Figures 9 and 13, the bottom plate 35 includes a plurality of discharge ports 53, each comprising a substantially diamond-shaped discharge area 56, a slot 54 or channel portion extending across one corner of the area 56 and at right angles to the longitudinal axis of the bottom plate 35, and a throat 55 connecting the slot 54 with the discharge area 56. In the form shown in the drawings, the ports 53 are symmetrical with respect to the axis of the bottom plate 35. Figure 9 shows the apparatus as further including a pair of shutters 57 and 58 slidable along the bottom of the hopper 34 relative to the discharge ports 53. A plurality of guide members 59 are spaced along the bottom of the plate 35 and act to support and guide the shutters 57 and 58. Each of the guide members 59 is provided with a pair of spring tongues 60 and 61 the purpose of which is to hold the shutters 57 and 58 in abutment with the bottom plate 35, yet permit reciprocal sliding movement therealong.

Each of the shutters 57 and 58 preferably includes unmutilated diamond-shaped apertures 62 which are registrable with the discharge areas 56 of the discharge ports 53. Advantageously, the apertures 62 may be flared downwardly, as shown in Figures 8 and 13, to avoid crowding and compacting the material which is being discharged therethrough and thereby facilitate spreading the material evenly.

Referring now to Figures 5, 6 and 9, a center bridging member 63 is secured to the lower legs of the angle irons 40, 40. Extending from the front portion of the bridging member 63 is a drawbar 78 (Figures 5 and 9) provided with a tractor hitch 86 at the free end thereof. A pair of tie rods 84 and 85 interconnect the front angle iron 40 with the drawbar 78, while a third tie rod 79 is connected to the top of the front wall 36. A stud 64 projects downwardly from the bridging member 63, and acts as a pivot about which the bell crank 65 rotates, said bell crank being retained on the stud 64 by the cotter pin 66. Two pivot pins 67 and 68 are carried by the crank 65 eccentric of the stud 64, and are connected to the links 69 and 70, respectively. An eye bolt 71 adjustably secured to the link 69 connects said link to the pin 72 on the shutter 57, while a corresponding eye bolt 73 is connected to the pin 74 on the shutter 58.

By turning the bell crank 65 in a clockwise direction, as viewed in Figure 9, it is apparent that the shutters 57 and 58 will each move away from the bridging member 63, and thereby reduce the effective discharge area defined by the discharge ports 53 and the apertures 62. Conversely, if the bell crank 65 is rotated in a counterclockwise direction, the shutters 57 and 58 will move inwardly toward the bridging member 63 and thereby increase the effective discharge area through which the material is dispensed (Figure 13).

The bell crank 65 may be conveniently rotated to give the desired setting of the shutters 57 and 58, through movement of the control lever 75 (Figures 5 and 9). Said control lever 75 is pivotably mounted on the pin 76 carried by the strut 77 secured between drawbar 78 and the tie rod 79. The lower portion of the control lever 75 extends through the slot 80 in the drawbar 78 and is drivably connected to the bell crank 65 through the connecting rod 81. When the handle 82 of the control lever 75 is pushed toward the hopper 34, the bell crank 65 turns in a clockwise direction, as viewed in Figure 9. In this way the shutters 57 and 58 may be moved to cover completely the discharge ports 53. As further shown in Figure 5, the drawbar 78 is provided with a hitch 86 whereby the spreader may be connected to a tractor or other propelling vehicle. Thus, the handle 82 will be in close proximity to the driver of the pulling vehicle, so that said driver can quickly close the discharge ports 53 by reaching back, grasping the handle 82 and pushing it away from him.

Referring now to Figure 14, a flow regulator plate 87 is secured to the drawbar 78 by the thumb screw fastener 88 positioned to the rear of the slot 80. The plate 87 is provided with a series of stop edges 89 which lie on progressively different radii with respect to the pivot axis of the thumb screw fastener 88. As shown in Figures 5 and 14, the lower portion of the control lever 75 cannot move along the slot 80 beyond the particular stop edge 89 intersecting the same. The operator can therefore adjust the degree of registration between the apertures 62 and the discharge ports 53 by positioning the regulator plate 87 so that the appropriate stop edge 89 is in alignment with the slot 80. In the example of Figure 14, one portion of the regulator plate 87 is marked to read in pounds of material discharged for each acre of ground covered, while another portion is marked in various degrees of openings commensurate with the proper sowing of grains, grasses, legumes, etc. When the projection 90 is aligned with the slot 80, the control lever 75 is locked against opening, so that the shutters 57 and 58 cannot inadvertently shift to open the discharge ports 53. On the other hand, the discharge ports 53 are fully opened when the notch 91 is aligned with the slot 80, and the control lever 75 moved thereagainst.

Referring now to Figures 6 and 8, a channel bracket 92 is secured to each of the end walls 38 and 39. A hollow stub shaft 93 is bolted or otherwise secured to each of the channel brackets 92, 92, and is provided with suitable bearing surfaces 94 and 95. In the embodiment shown, the hub 96 of each of the rubber tired wheels 97, 97, is rotatable about its respective stub shaft 93.

A pair of co-axial armature shafts 98 and 99 are rotatably supported at the outer ends thereof by the hollow stub shafts 93, 93. As best shown in Figure 8, the shafts 98 and 99 are drivably connected to the hubs 96, 96 through the shear pins 100, 100, a sealing collar 101 being interposed between the projecting ends of the shafts 98 and 99 and their respective hubs 96, 96. The inner ends of the armature shafts 98 and 99, are rotatably supported by the bearing sleeve 102 which in turn is secured to the center post 45. As is further shown in Figure 8, the inner ends of the shafts 98 and 99 are each provided with a thrust collar 103. Each of the thrust collars 103 in turn mates with a sealing ring 104. The sealing rings 104 are preferably spaced from the interior shoulder of the sealing ring groove 105 to provide an oil or grease pocket for insuring adequate lubrication of the bearing sleeve 102 and the thrust collars 103. Grease or other lubricant is introduced into the bearing sleeve 102 through a lubricating fitting 106 (Fig. 5).

The outer end portions of the shafts 98 and 99 are each provided with a thrust collar 107 separated from its respective stub shaft 93 by a brass or other suitable thrust ring 108. A rubber or other suitable sealing ring 109 is tightly fitted about the thrust collar 107 and between said collar and the adjacent end wall 38 (or 39) of the hopper 34. In the event that any of the material within the hopper 34 should escape past the sealing ring 109, said material may fall through the port 110 formed in the lower flange of the channel bracket 92, and therefore will not accumulate about the shaft 98 (or 99) and work its way into the bearings. Lubrication of the outer end portions of the shafts 98 and 99 is effected through the lubricating fitting 111 and the lubricant feed passages 112.

Thus as the spreader is drawn forward, the turning motion of the wheels 97 is transmitted through the shear pins 100 to the armature shafts 98 and 99. Since each of the shafts 98 and 99 are independently driven by a separate wheel 97, the rate of rotation will vary at the rate of rotation of said wheel 97. Hence, if the spreader is being turned, the outer or swinging wheel will not skid, but instead will turn more rapidly than the inner or pivoting wheel.

Secured to the armature shafts 98 and 99, and spaced therealong in a manner conforming to the spacing between the slots 54 of the discharge ports 53, are a plurality of disk-shaped members 113 which provide both means for breaking and making dynamic the discharge port 53, in the manner described above, and means for charging the discharge ports 53 from the material immediately adjacent said ports. Referring now to Figures 8 and 10, each of the members 113 is provided with a plurality of sets of stepped feeder teeth 114. Each set of feeder teeth 114 is adapted to project into the slot 54 of the discharge port 53 with which it is associated, entering the slot 54 close to one end thereof and leaving the slot close to the other end thereof as the armature shafts 98 and 99 rotate in the direction indicated in Figure 10. At the same time, the teeth 114 fit closely within the corresponding slots 54, as shown, so that the two sides of each of the teeth 114 move adjacent and parallel to the respective sides of the corresponding slot 54. While the teeth 114 penetrate into the slot 54, they are radially spaced from the shaft 98 such that they do not project through the slot 54 and beyond the bottom plate 35. Were the teeth 114 to project beyond the bottom plate 35 in the embodiment shown, then the shutters 57 and 58 could not be moved along the bottom plate 35 without contacting and interfering with the free movement of the members 113. Of course, if there is clearance between the bottom plate 35 and the shutters 57 and 58 (for example, in production a clearance of between 1/64" and 1/16" is frequently present) then the teeth 114 may be extended beyond the bottom plate 35 to the extent of this clearance. This feature is desirable since it permits the operator to adjust the shutters 57 and 58 along the bottom plate 35 so that any desired degree of registration between the apertures 62 and the ports 53 may be obtained.

As is further shown in Figures 8 and 10, each of the members 113 is provided with a plurality of circumferentially spaced wings or charging vanes 115 projecting alternately in opposite directions from said member 113 and inclined so as to sweep material toward the path of the feeder teeth 114 as the armature shaft 98 rotates in the direction shown. In addition to exerting an axial component and a tangential component against the material being handled, the wings 115 are shown as shaped to also exert a radial force so that said wings 115 act to impel material into the slots 54 as each member 113 rotates. Thus each pair of oppositely inclined wings 115 loads the corresponding slot 54 with material while the following set of feeder teeth 114 penetrates the slot 54 to push a measured quantity of said material out of the slot. Figure 10 shows the outer, working edges of the wings 115 to lie in a circle concentric with but of a lesser diameter than the working circle of the feeder teeth 114, so that there is a small clearance between the wings 115 and the upper surface of the bottom plate 35 as the armature shaft 98 turns. Referring to Figure 12, it will be seen that the wings 115 extend over an unported portion of the bottom plate 35 throughout substantially all of their travel, and it is this area of the bottom plate 35 which is swept by the wings 115.

Referring now to Figures 8 and 11, the means for agitating and distributing the material lengthwise of the armature shafts 98 and 99, so that the flow of material is uniform from each of the discharge ports 53, is shown as comprising a plurality of spiders 116 or agitator vanes spaced intermediate the disk-shaped members 113, respectively. Each of the spiders 116 includes a pair of agitator arms 117 and 118 extending longitudinally of the spider 116, the two arms 117 and 118 being approximately 180 degrees out of phase with each other. In the spider 116 of Figure 11, the two arms 117 and 118 project on opposite sides of the spider, respectively. On the other hand, the two end members 113 on each of the shafts 98 and 99 are each provided with a pair of agitator arms 117, 118 which project in the same direction. In Figures 8 and 12, the agitator arms 117 of the spiders 116 are disposed to pass over and adjacent to the discharge areas 56 of the discharge ports 53, while the other agitator arms 118 pass over unported portions of the bottom plate 35. Figure 12 further shows the leading edge surface 119 of the agitator arm 118 as being inclined from a plane containing the axis of rotation of the shaft 98 and as a result material which is contacted by the leading edge 119 is swept toward the disk-shaped member 113, where it is scooped up by the wings 115. Since the leading edge 119 of the arm 117 (Figure 11) is also inclined in the same manner, it will shift material away from the member 113. In addition, and as is best shown in Figure 11, each of the agitator arms 117, 118 is inclined so that the trailing edge 120 is less distant from the center of rotation of the shaft 98 than is the leading edge 119. Hence, as the spider 116 rotates, the arms 117 and 118 scoop up and agitate material which lies adjacent the bottom plate 35.

As is best shown in Figure 7, the spiders 116 may be circumferentially spaced around the armature shaft 99 so that the arms 117 and 118 lie helically about the axis of the shaft 99. When the spiders 116 are arranged in this fashion, material is simultaneously mixed and moved longitudinally along the shaft 98 in a corkscrew manner, the arms 117 forcing the material toward the center of the hopper 34 as indicated by the directional arrows a, a, while the arms 118 act to feed material in the direction shown by the directional arrows b, b. At the same time, since the arms 117 are staggered, any lumps of hardened material which are wedged between the front wall 36 and the turning members 113 and spiders 116 will be contacted at any given moment by one or at most two arms. By staggering these impact loadings on the shafts 98 and 99, the maximum bending stresses in the shafts may be held within very safe limits, and locking of the shafts against turing is avoided. In practice I have found that the circumferential spacing between adjacent spiders 116 should ordinarily be of the magnitude of about 25 degrees since this gives maximum efficiency in distribution of material longitudinally of the shaft 98 or 99.

To use the spreader shown for the purpose of dispensing fertilizer or other material, the drawbar 78 is first hitched to the tractor or other propelling means, the hopper 34 is filled with material to be spread, and the flow regulator plate 87 set to the desired rate of discharge. As the spreader moves forward, the rotating wheels 97, 97 turn the shafts 98 and 99 and the members 113 and spiders 116 fastened thereto. These latter devices may be metal which is case hardened or heat treated so that they will pulverize material which they grind against without being abraded or otherwise damaged. Such material as case hardened steel also possesses sufficient rigidity as to be substantially non-flexible and non-yielding under the application of force necessary to break up and crush materials of the type specified above. As the shafts 98 and 99 continue to turn, the material is transported therealong in the manner shown schematically in Figure 7, so that even when the bulk or all of the material is deposited in one portion of the hopper 34, it will be rapidly shifted along the shafts 98 and 99 and uniformly distributed within the hopper. Any hard lumps of the material, or any material which has caked, is pulverized and comminuted and falls between the disk-shaped members. But this material cannot become packed between the members 113, since the spiders 116 continually shift the material back and forth along the shafts 98 and 99, and since the scooping action of the agitator arms 117 imparts an up and down motion to the particles of material. As the material is being shifted from side to side, the wings 115 dig into and scoop out material and drive it toward the discharge ports 53 and especially the slots 54, in the manner described above. Those agitator arms 118 which pass over the discharge ports 53 also aid in charging the same with material.

As the material is forced into the slots 54 it is again subjected to a pulverizing action, this time by the teeth 114 which churn through the slots 54 as the shafts 98 and 99 are turned. Thus any hardened pellets of the material which are not pulverized by the spiders 116 or wings 115, and which are too large to pass through the effective discharge areas of the ports 53, are trapped and ground up within the slots 54 and then discharged. This feature is of particular benefit since all material placed within the hopper 34 is discharged therefrom. In contrast, the prior art devices are incapable of handling hardened pellets of the material (which frequently comprise 20% or more of the total material) so that the pellets remain within the hopper or bin. Therefore, as more material is added, the percentage of these pellets to the total charge increases progressively.

Since the slots 54 are alternately charged with and cleared of material, the actual flow from each of the ports 53 is pulsating. However, the frequency of the pulsation is so rapid at normal operating speeds of the shaft 98 or 99, that for all practical purposes the flow of material from each port 53 may be considered as being uniform and continuous.

When the effective discharge area of the ports 53 is relatively large (Figure 13), the radial pressure exerted by the arms 117 and 118 upon material within the ports 53 acts to clear said ports of material and especially to break up any stratification of material in those corners of the ports 53 distant from the throat 55.

Because my apparatus so completely pulverizes and mixes together the material to be dispensed, it is especially suited to the spreading of mixtures of two or more materials. Thus, when several types of materials are dumped separately into the hopper 34, it requires only a few turns of the shafts 98 and 99 to thoroughly mix them together. Advantageously, this mixing can be done while the spreader is being pulled to the place where the mixed substances are to be spread, the shutters 57 and 58 being in the closed position while the spreader is being transported. When the operator moves the handle 82 into the "open" position, the mixed material flows uniformly and continuously without separation as long as the spreader is moving.

If the fertilizer or other material contains moisture, is naturally cohesive, or for any other reason inclines to cake or aggregate, there will be a tendency for it to fill up and plug the discharge ports without passing through them, thus preventing additional material from being discharged. While the prior art devices provide no means for avoiding clogging of the discharge ports, in my construction, as pointed out previously, the feeder teeth 114 continually break and make dynamic one corner of the discharge ports 53. Therefore, any material which tends to cake within the discharge port 53 can remain there no longer than the time interval between the passage of the trailing tooth of one set of the teeth 114, and the leading tooth of the next following set. Breaking this one corner causes the entire caked or aggregated sheet within the effective discharge area of each of the ports 53 and its associated aperture 62, to crumble into substantially granular form and to pass through and out of the discharge port, even when the port is set at the smallest effective discharge area. And because the teeth 114 move closely adjacent to the sides of the corresponding slots 54, any material which accumulates in the notches between adjacent teeth 114 is subjected by the sides of the slots 54 to a shearing action which continuously breaks down the accumulated material and keeps the material from building up on the member 113 to render it ineffectual, as otherwise would occur. Any tendency of the material to clog within the apertures 62 is largely avoided by relieving or flaring out the edges in the manner shown in Figure 13, as mentioned previously.

While my invention is particularly suited to the spreading of fertilizers and other fluent solvent chemicals, it will also give superior results when used to sow grains, grasses, legumes, or mixtures thereof. As is well known, such materials tend to cake when compressed, especially if moist or green. Thus there is somewhat the same tendency for these latter substances to clog within the discharge ports 53 as there is for damp or green fertilizer to clog the ports 53. But as in the case of the latter, my invention effectively prevents clogging of the discharge ports 53 when grains, grasses, or legumes are dispensed, so that there is at all times a steady flow of the material from the hopper 34.

A useful modification of the apparatus thus far described is shown in Figure 15, the principal difference residing in the manner in which the disk-shaped members 113 and spiders 116 are grouped upon the shafts 98 and 99. Rather than ganging all of the spiders 116 on either one of the shafts 98 or 99 in a single helical configuration, as shown in Figure 7, the continuous helical configuration is broken at approximately the mid-point of the shaft 98 (or 99), so that the spiders 116a and 116b are substantially perpendicular to each other. Thus, instead of one helix on each of the shafts 98 and 99, there are two helices approximately 90 degrees out of phase. Accordingly, the possibility of the two spiders 116a and 116b striking against a hard lump of material at the same time is virtually eliminated. In this way, the bending stresses imposed at the mid or weakest flexural point of the shafts 98 and 99 are thereby held to the minimum possible values.

A further modification of the apparatus shown in Figures 5-14, comprises the modified disk-shaped member 121 of Figures 16 and 17. As in the case of the member 113, the member 121 includes a plurality of circumferentially spaced sets of feeder teeth 114. As best shown in Figure 17, the member 121 is secured to a shaft 134 and includes a pair of wiping blades 122, 122 the line of action of which is spaced axially from that of the feeder teeth 114. These wiping blades 122, 122 are disposed to sweep across the throat 55 of the discharge port 53 (Figure 18) and thereby prevent to a large degree stratification and clogging of material within the throat 55. In effect, therefore, the wiping blades 122, 122 are an adjunct to the feeder teeth 114, since they augment and make more complete the dynamic action within the discharge port 53. However, unlike the feeder teeth 114, the wiping blades 122, 122 do not penetrate into the discharge port 53.

Another variation in the member 121 from that of the member 113 resides in the tabs 123, 123 which are inclined from the median plane of the member 121 in the manner shown in Figure 19. The tabs 123, 123, like the feeder teeth 114, are adapted to project into the slot 45, as the shaft 134 turns, and because of their skew shape clean the slot 54 thoroughly, thereby easing the work of the feeder teeth 114 in sweeping through said slot 54. As is shown in Figures 18 and 20, the wings 124 act to sweep material toward the feeder teeth 114 in substantially the same manner as the corresponding wings 115 of the member 113.

While the embodiments of Figures 5-20, and the diagrammatic structure of Figures 3 and 4 show the principal discharge area of the discharge port as being diamond-shaped, other shapes may of course be used to advantage. Thus, in the embodiment of Figure 21 the hopper bottom 125 is shown as including a substantially oblate discharge port 126 and a correspondingly shaped aperture 127 in the shutter plate 128. This embodiment differs further from that of Figure 12, for example, in that the slot 129 through which the member 113 sweeps does not intersect a corner of the port 126. This arrangement is particularly useful in that the vibratory impulses generated by the member 113 as it sweeps through the slot 129 are projected through a greater proportion of the discharge port than is the case of the embodiment of Figure 12. Furthermore, the curved shape of the port 127 discourages stratification of material at the edges, especially at those edges distant from the member 113.

In another embodiment of my invention, shown in Figure 22, the member 113 operates within the principal discharge port 130 in the hopper bottom 131, rather than within a separate slot. By positioning the member 113 adjacent to that edge of the port 130 which forms, with the aperture 132 in the shutter plate 133, the smallest effective discharge areas, an efficient distribution of material at low rates of feed is obtained.

Thus it will be apparent that my novel apparatus results in the efficient spreading and/or sowing of material in both small and large quantities, even though this material be wet, lumpy, hard, cohesive, or has some other characteristic which would cause it to stratify and cake within a static discharge port. Because of this novel feature, my invention is specially well suited, by way of example, to the spreading of concentrated fertilizers, cohesive fertilizers such as super phosphate, green or improperly cured fertilizers, sodium chloride (used for killing noxious weeds), and to the accurate sowing of grains, grasses, legumes and the like.

While I have shown and described certain preferred embodiments of my invention, it is to be understood that these embodiments have been given by way of example only, and that various changes and rearrangements of the details shown herein may be made without departing from the spirit of the invention, the scope of which is defined in the appended claims.

I claim:

1. In a material spreader for fertilizers and the like including a hopper having a discharge port, the combination comprising: means for forcibly charging said discharge port with a quantity of material within said hopper, shutter means for adjusting the effective discharge area of said discharge port, rigid, substantially non-deformable means for penetrating said discharge port to drive a portion of the material therein through said effective discharge area, and means constraining said charging means and said driving means to alternately charge said discharge port with material and drive a portion of said material through said port.

2. In a material spreader for fertilizers and the like including a hopper having a discharge port, the combination comprising: means for agitating material within said hopper, means for forcibly charging said discharge port with a quantity of said agitated material, shutter means for adjusting the effective discharge area of said discharge port, rigid, substantially non-deformable means for penetrating said discharge port to drive a portion of the material therein through said effective discharge area, and means constraining said charging means and said driving means to alternately charge said discharge port with material and drive a portion of said material through said port.

3. Dispensing apparatus for fertilizers including caustic, erosive, and cohesive fertilizers, said apparatus comprising: a hopper having a discharge port therein, said port having a substantially straight edge portion, shutter means for said discharge port, a member including a plurality of projections thereon of rigid, wear-resistant material, means constraining said member to move in a path in which said projections penetrate into but not beyond said discharge port during a portion only of each cycle of operation of said member and move substantially parallel and proximate to said straight edge portion, the leading edge of each of said projections being substantially perpendicular to said straight edge portion of said discharge port as said projection moves through said port, means for moving said member through said path, and means intermediate said projections for sweeping material into said discharge port before each of said projections moves therethrough.

4. Feed mechanism for material dispensing apparatus having a discharge port, comprising: a rotatable shaft, one or more vanes fixed to said shaft and inclined from their plane of rotation to charge said discharge port with material as said shaft turns, and a discharging member fixed to said shaft positioned for rotation in a plane intersecting said discharge port closely adjacent to an edge thereof, said discharging member being long enough to penetrate into said discharge port to force material therethrough, the tip of said discharging member which operates in said discharge port having a substantially radial and non-deformable leading surface, said discharging member being circumferentially spaced from said vanes on said shaft.

5. Feed mechanism for material dispensing apparatus having a discharge port, comprising: a rotatable shaft, agitator means fixed to said shaft on each side of said discharge port to shift material along said shaft toward said discharge port, one or more vanes fixed to said shaft and inclined from their plane of rotation to charge said discharge port with material as said shaft turns, and a discharging member fixed to said shaft positioned for rotation in a plane intersecting said discharge port closely adjacent to an edge thereof, said discharging member being long enough to penetrate into said discharge port to force material therethrough, the tip of said discharging member which operates in said discharge port having a substantially radial and non-deformable leading surface, said discharging member being circumferentially spaced from said vanes on said shaft.

6. Dispensing apparatus for fertilizers of the class which tend to set up chemically and cohere into hard masses, comprising a hopper having a discharge port, a shaft rotatable in said hopper, and a member secured to said shaft and of material which exhibits no sensible deformation as it strikes and is forced through hardened fertilizer, said member including a first portion inclined from the plane of rotation of said member to charge said port with said fertilizer, and a second portion circumferentially spaced from said first portion but following closely thereafter and having a notched edge section spaced from said shaft to penetrate into said port adjacent to an edge thereof as said shaft rotates, to expel from said discharge port a portion of the fertilizer swept into said port by said first portion of said member.

7. In combination, a material spreader including a hopper having a discharge port therein, a substantially disk-shaped member of relatively thin cross-section, means constraining said member to rotate in a plane which intersects said discharge port, said member comprising a plurality of sectors for charging said port with material and a plurality of sectors spaced intermediate said charging sectors, for driving material through said port, each of said charging sectors including portions skewed to drive material into said discharge port in front of the next successive material-expelling sector, each of said expelling sectors including tooth portions positioned to penetrate into said discharge port as said disk-shaped member rotates.

8. Feed mechanism for dispensing apparatus having a discharge port, comprising: a shaft, means for rotating said shaft normally in one direction, a member fixed to said shaft and including charging vanes inclined alternately to sweep material into said discharge port along an edge thereof as said shaft rotates in said one direction, and a plurality of rigid teeth extending substantially radially from said member and positioned to penetrate said discharge port closely adjacent said edge thereof, said teeth and said charging vanes being circumferentially spaced relative to said shaft to alternately load said discharge port with material and force said material through said discharge port.

9. A material spreader having a discharge port, said port including a substantially rectangular portion, a shaft rotatable in said spreader and a rigid metallic member of thin cross-section secured to said shaft and including a substantially arcuate edge portion having serrations therein, said member positioned on said shaft to cause said serrations to penetrate into said rectangular portion of said discharge port adjacent to an edge thereof during rotation of said shaft, whereby stratification of material in said discharge port is inhibited, said member also including at least two wings on opposite sides thereof, said wings angled from said member to sweep material toward the plane of said serrated edge portion as said member rotates in one direction, said wing on that side of said member which is nearer to said edge of said discharge port terminating short of said serrations to provide clearance between said wing and that portion of said spreader containing said discharge port.

10. A material spreader having a discharge port, said port including a substantially rectangular portion, a shaft rotatable in said spreader, a disk-shaped member secured to said shaft, said member having serrations in the peripheral edge portion thereof, said serrated edge portion being positioned to penetrate into said rectangular portion adjacent to an edge thereof to inhibit stratification of material in said discharge port, said member including circumferentially spaced wings projecting alternately therefrom and angled from said member to sweep material toward said serrated edge portion as said member rotates in one direction, said wings on that side of said member proximate said edge of said discharge port terminating short of said serrations in said edge portion to provide clearance between said wings and that portion of said spreader containing said discharge port.

11. A material spreader including a hopper having a discharge port therein, said discharge port including a rectangular portion, shutter means slidable relative to said discharge port and adapted to shield off, in various degrees, said rectangular portion, a shaft in said hopper substantially normal to said rectangular portion, means for turning said shaft, a rigid metallic member secured to said shaft and having circumferentially spaced teeth positioned to pass successively into and out of said rectangular portion adjacent to an edge thereof during each revolution of said member, means on said member adapted to sweep material toward the path of said teeth as said member rotates in one direction, and means carried by said shaft adapted to both agitate material within said hopper and displace a portion of said agitated material toward said member.

12. Apparatus for dispensing superphosphates and like fertilizers, comprising: a hopper having a discharge port therein, said discharge port including a rectangular portion, shutter means slidable relative to said discharge port and adapted to shield off, in various degrees, said rectangular portion, a shaft in said hopper substantially normal to said rectangular portion, means for turning said shaft, a member secured to said shaft and having a plurality of circumferentially spaced sets of teeth positioned to penetrate into said discharge port, during each revolution of said member, adjacent to that side of said portion which forms with said shutter means the smallest effective discharge area of said port, said teeth being of material which is both non-deformable and abrasion resistant against the erosive action of said fertilizers, means on said member for sweeping material toward the path of said teeth as said member rotates in one direction, said sweeping means positioned on said member to charge said port with material prior to movement of each set of teeth through said port, and means carried by said shaft for both agitating material within said hopper and displacing a portion of said agitated material toward said member.

13. In a spreader including a hopper having a discharge port therein, and shutter means movable relative to said hopper and having an aperture therein adapted to register in varying degrees with said discharge port, whereby the effective discharge area of said port may be adjusted, means for inhibiting clogging of said discharge area, said means comprising: a slot in said hopper extending across an end of said discharge port and connected thereto, and a member rotatable in said hopper and including a radially projecting portion positioned to project into said slot during a portion of each cycle of rotation of said member, said portion being substantially as wide as said slot.

14. In a spreader including a hopper having a discharge port in the bottom portion thereof, and a shutter movable along said bottom portion and having an aperture adapted to register in varying degrees with said discharge port, whereby the effective discharge area of said port may be adjusted, means for inhibiting clogging of said discharge area, said means comprising: a member rotatable within said spreader, a slot in said bottom portion of said hopper, said slot disposed substantially perpendicular to said member and extending across that end of said discharge port which forms with said aperture the smallest effective discharge areas, and a plurality of spaced, rigid elements extending radially from said rotatable member and positioned to project into but not appreciably beyond said slot as said member rotates.

15. A material spreader having a discharge port, said port including a principal discharge area and a slotted portion traversing and connected to one end of said area, a shaft rotatable in said spreader, and a substantially circular disk member secured to said shaft, a plurality of circumferentially spaced teeth on said disk member adapted to pass successively into and out of said slotted portion during each revolution of said disk member, and a plurality of circumferentially spaced wings projecting alternately in opposite directions from said disk member and inclined to sweep material toward the path of said teeth as said member rotates in one direction, the radial distance from said shaft to the outermost edges of said wings being less than the radial distance to said teeth, by at least the depth of said slot.

16. A material spreader comprising a hopper having a plurality of aligned discharge ports therein, a shaft substantially parallel to said aligned discharge ports, each of said ports including a channel portion substantially perpendicular to the principal discharge area, a plurality of disk-shaped members spaced along said shaft to register with said discharge port, each of said disk-shaped members having circumferentially spaced teeth positioned to pass successively into and out of the channel with which it is aligned, circumferentially spaced wings projecting in opposite directions from said disk-shaped member and inclined so as to sweep material toward the path of said teeth as said disk-shaped member rotates in one direction, a plurality of agitator members mounted on said shaft intermediate said disk-shaped members, respectively, each of said agitator members including a pair of arms projecting longitudinally from and on opposite sides of said member, respectively, said arms being 180 degrees out of phase and having material-moving surfaces adapted to sweep material toward the two disk-shaped members lying on opposite sides thereof, respectively.

17. A material spreader including a hopper having a discharge port therein, said discharge port including a principal discharge area and a slotted portion traversing and connected to one end of said area, a shutter slidable relative to said discharge port, and having an aperture adapted to be disposed in various degrees of registration with said port, said aperture, so long as it is in any respect in register with said port, being at least in partial register with said slotted portion, means for shifting said shutter, two hollow stub shafts at opposite ends of said material spreader, respectively, two wheels rotatably mounted on said stub shafts, respectively, shaft means journaled by said hollow stub shafts, means drivably connecting said wheels to said shaft means, a member secured to said shaft and having circumferentially spaced teeth positioned to pass successively into and out of said slotted portion during each revolution of said member, means on said member adapted to sweep material toward the path of said teeth as said member rotates in one direction, and means carried by said shaft means adapted to agitate and distribute material along said shaft means.

18. A material spreader including a hopper and a rotatable shaft therein, said hopper having one or more discharge ports therein each of which comprises a substantially diamond-shaped portion and a slot portion disposed substantially perpendicular to said shaft and connected to said diamond-shaped portion at one corner thereof, a member secured to said shaft and including projections positioned to penetrate into said slot portion, a shutter disposed contiguous to the exterior of said hopper and having one or more apertures therein corresponding substantially in shape to said diamond-shaped portions of said discharge portions, and means for shifting said shutter relative to said hopper to vary the degree of registration of said apertures with said diamond-shaped openings.

19. In a material spreader, a hopper and a rotatable shaft therein, said hopper having a discharge port comprised of a primary opening, a throat extending from one end of said opening, and a slot extending perpendicular to said shaft and joined to said throat, a member carried by said shaft and including one or more teeth on the periphery thereof, said teeth positioned to pass into, but not penetrate appreciably beyond said slot during each rotation of said member, said member having material-moving surfaces adapted to sweep material on both sides of said member toward said teeth as said member rotates in one direction, and one or more blade members spaced axially from said teeth and adapted to sweep over said throat as said member rotates, said blade members being so proportioned and arranged that there is clearance between said blade members and said hopper as said member rotates.

20. An armature for a ported hopper of a material spreader, comprising: a shaft, a rigid disk secured to said shaft and including radially projecting peripheral teeth, said disk further provided with wings projecting in opposite direction from the median plane of said disk, said wings being less distant than said teeth from the axis of rotation of said shaft, and skewed to sweep material toward said plane, said wings also being circumferentially spaced from said teeth, and a crank secured to said shaft and including an arm extending substantially longitudinally thereof, said arm being less distant than said teeth from said axis of rotation, the leading edge of said arm being inclined from a plane containing said axis of rotation to sweep material toward said disk as said shaft rotates.

21. An armature for a ported hopper of a material spreader, comprising: a shaft, a series of axially spaced members carried said shaft and including rigid radially projecting peripheral teeth, each of said members also including material moving portions less distant from the axis of rotation of said shaft than said teeth, and skewed to impel material on each side of said member toward the plane of rotation of said teeth, said material moving portions on each of said members being circumferentially spaced from said teeth projecting therefrom, and means carried by said shaft adapted both to agitate material and to displace a portion of said agitated material toward said material moving portions.

22. An article of manufacture, comprising: a shaft, a substantially disk-shaped member carried by said shaft, said member having serrations in the peripheral edge portion thereof, said member including circumferentially spaced wings projecting therefrom, said wings being less distant than said serrations from the axis of said shaft, and a pair of arms projecting longitudinally from said member and spaced apart approximately 180 degrees, said arms being less distant than said serrations from the said axis of said shaft, and having material-moving surfaces adapted to shift material substantially longitudinally of said shaft.

EDMOND A. JUZWIAK.

REFERENCES CITED

The following references are of record in the file of this patent:

UNITED STATES PATENTS

| Number | Name | Date |
|---|---|---|
| 27,390 | Selby | Mar. 6, 1860 |
| 93,368 | Thomas et al. | Aug. 3, 1869 |
| 93,434 | Ham | Aug. 10, 1869 |
| 746,713 | Langston | Dec. 15, 1903 |
| 1,179,285 | Crenshaw | Apr. 11, 1916 |
| 1,334,223 | Byrd | Mar. 16, 1920 |
| 1,397,689 | Krotz | Nov. 22, 1921 |
| 1,553,715 | Pender | Sept. 15, 1925 |
| 1,650,808 | Van Brundt | Nov. 29, 1927 |
| 1,691,192 | Holmes et al. | Nov. 13, 1928 |
| 2,035,058 | Feltman | Mar. 24, 1936 |

FOREIGN PATENTS

| Number | Country | Date |
|---|---|---|
| 11,678 | Great Britain | May 22, 1902 |
| 382,626 | Germany | Oct. 4, 1923 |

Certificate of Correction

Patent No. 2,510,231                                                      June 6, 1950

EDMOND A. JUZWIAK

It is hereby certified that error appears in the printed specification of the above numbered patent requiring correction as follows:

Column 3, line 66, for "sepcification" read *specification*; column 9, line 28, for "turing" read *turning*; column 11, line 70, for "slot 45" read *slot 54*; column 14, line 45, after the word "spreader" insert a comma; column 18, line 5, after "carried" insert *by*;

and that the said Letters Patent should be read as corrected above, so that the same may conform to the record of the case in the Patent Office.

Signed and sealed this 13th day of February, A. D. 1951.

[SEAL]

THOMAS F. MURPHY,
                                                                *Assistant Commissioner of Patents.*